US00RE48315E

(19) United States
(12) Reissued Patent
Gauger, Jr.

(10) Patent Number: US RE48,315 E
(45) Date of Reissued Patent: Nov. 17, 2020

(54) IN-EAR AUDIO DEVICE CUSTOMIZATION

(71) Applicant: Bose Corporation, Framingham, MA (US)

(72) Inventor: Daniel M. Gauger, Jr., Berlin, MA (US)

(73) Assignee: Bose Corporation, Framingham, MA (US)

(21) Appl. No.: 15/480,910

(22) Filed: Apr. 6, 2017

Related U.S. Patent Documents

Reissue of:
(64) Patent No.: 9,002,023
Issued: Apr. 7, 2015
Appl. No.: 13/448,848
Filed: Apr. 17, 2012

(51) Int. Cl.

| | |
|---|---|
| ***H04R 29/00*** | (2006.01) |
| ***H04M 1/05*** | (2006.01) |
| ***H04R 1/10*** | (2006.01) |
| *H04M 1/60* | (2006.01) |
| *H04R 25/00* | (2006.01) |

(52) U.S. Cl.
CPC ..... *H04R 29/001* (2013.01); *H04M 1/05* (2013.01); *H04R 1/10* (2013.01); *H04R 1/1058* (2013.01); *H04M 1/6058* (2013.01); *H04R 1/105* (2013.01); *H04R 1/1083* (2013.01); *H04R 25/456* (2013.01); *H04R 25/658* (2013.01); *H04R 2201/105* (2013.01); *H04R 2201/107* (2013.01); *H04R 2460/01* (2013.01); *H04R 2460/15* (2013.01)

(58) Field of Classification Search
CPC .. H04R 29/001; H04R 1/1058; H04R 1/1083; H04R 2201/105; H04R 2460/01; H04R 25/456; H04M 1/6058
See application file for complete search history.

(56) References Cited

U.S. PATENT DOCUMENTS

| | | | |
|---|---|---|---|
| 6,339,648 | B1 | 1/2002 | McIntosh et al. |
| 6,687,377 | B2 | 2/2004 | Voix et al. |
| 6,754,357 | B2 | 6/2004 | McIntosh et al. |
| 7,418,105 | B2 | 8/2008 | McIntosh |
| 7,740,104 | B1 | 6/2010 | Parkins et al. |

(Continued)

FOREIGN PATENT DOCUMENTS

WO 2011163565 A1 12/2011

OTHER PUBLICATIONS

First European Office Action dated Jan. 26, 2018 for European Patent Application No. 13 718 456.0-1207.

(Continued)

*Primary Examiner* — Eric B. Kiss
(74) *Attorney, Agent, or Firm* — Brian M. Dingman; Dingman IP Law, PC

(57) ABSTRACT

An in-ear audio device has a casing on which is disposed one or more bags are positioned to be filled with fillable material during a customization process in which a test sound is acoustically output into an ear canal by an acoustic driver of the in-ear audio device while the one or more bags are being filled, and a microphone acoustically coupled to the ear canal is employed to detect sounds within the ear canal that are indicative of the frequency response of the acoustic output of the acoustic driver to determine when the degree of sealing of the ear canal by the one or more bags is sufficient to achieve a desired quality of frequency response.

35 Claims, 3 Drawing Sheets

(56) References Cited

U.S. PATENT DOCUMENTS

| | | | | |
|---|---|---|---|---|
| 7,864,972 | B2 | 1/2011 | McIntosh et al. | |
| 8,116,489 | B2 * | 2/2012 | Mejia | H04R 25/505 381/318 |
| 8,213,629 | B2 * | 7/2012 | Goldstein et al. | 381/74 |
| 8,571,227 | B2 * | 10/2013 | Donaldson | H04R 1/1083 381/71.1 |
| 9,609,424 | B2 * | 3/2017 | Goldstein | H04R 1/1016 |
| 2002/0076057 | A1 | 6/2002 | Voix | |
| 2008/0247561 | A1 * | 10/2008 | Smith | H04R 1/1075 381/72 |
| 2009/0028356 | A1 | 1/2009 | Ambrose et al. | |
| 2009/0238386 | A1 * | 9/2009 | Usher et al. | 381/315 |
| 2010/0074451 | A1 * | 3/2010 | Usher | H04R 25/70 381/58 |
| 2010/0316225 | A1 | 12/2010 | Saito et al. | |
| 2011/0235843 | A1 | 9/2011 | Keady et al. | |
| 2013/0051592 | A1 * | 2/2013 | Campbell et al. | 381/328 |
| 2013/0136285 | A1 * | 5/2013 | Naumann | 381/329 |

OTHER PUBLICATIONS

Second European Office Action dated Jul. 4, 2018 for European Patent Application No. 13 718 456.0-1207.
International Search Report and Written Opinion dated Sep. 2, 2013 for International application No. PCT/US2013/036301.
Invitation to Pay Additional Fees dated Jul. 3, 2013 for International Application No. PCT/US2013/036301.

* cited by examiner

IN-EAR AUDIO DEVICE CUSTOMIZATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

This disclosure relates to customizing the fit of an in-ear audio device within a portion of an ear.

BACKGROUND

The use of audio devices structured to be at least partly inserted into one or both ears of a user (i.e., so called "in-ear" audio devices or "intra-aural" audio devices) to enable audio to be acoustically output to one or both ears of a user has become commonplace, especially with the widespread use of digital audio recording playback devices (e.g., MP3 digital file players) and two-way wireless communications devices (e.g., cell phones and personal data assistant devices incorporating cell phone capabilities). However, difficulties remain in providing in-ear audio devices that fit comfortably in users' ears, and that fit well enough to cooperate with the structure of the ear to provide a high quality of sound in the acoustic output of audio. Much of the reason for this difficulty is that no two ears have shapes that are ever exactly alike, such that an in-ear audio device that is able to provide a good fit in an ear of one user may be unable to do so in an ear of another user.

One well known solution is to provide in-ear audio devices with a selection of removable hollow ear couplings that are each shaped and/or sized differently to enable the in-ear audio devices to be used with different dimensions and shapes of ears. However, as is well-known to the users of in-ear devices, achieving a good fit can be difficult even with in-ear audio devices that are supplied with a relatively extensive assortment of hollow ear couplings from which to choose.

SUMMARY

An in-ear audio device has a casing on which is disposed one or more bags are positioned to be filled with fillable material during a customization process in which a test sound is acoustically output into an ear canal by an acoustic driver of the in-ear audio device while the one or more bags are being filled, and a microphone acoustically coupled to the ear canal is employed to detect sounds within the ear canal that are indicative of the frequency response of the acoustic output of the acoustic driver to determine when the degree of sealing of the ear canal by the one or more bags is sufficient to achieve a desired quality of frequency response.

In one aspect, an apparatus includes: a casing shaped to fit into a portion of an ear, the casing comprising a bag fillable with a filling material to customize the fit of the casing within the portion of the ear to create a seal between the casing and the portion of the ear that acoustically separates an ear canal of an ear from an external environment that is external to the ear and casing; an acoustic driver disposed within the casing to acoustically output a test sound into the ear canal; and at least one aperture formed in the casing to permit a portion of a microphone to be inserted therethrough from the external environment external and into the ear canal to acoustically couple the microphone to the ear canal.

The casing may further include structure forms an open interior portion within the casing that is interposed between the ear canal and the external environment, and that separates the open interior portion from the ear canal and the external environment. Also, the at least one aperture formed in the casing may include both a first aperture coupling the open interior portion to the external environment and a second aperture coupling the open interior portion to the ear canal, where the first and second apertures are sufficiently aligned to enable the portion of the microphone to be inserted through both the first and second apertures.

In another aspect, a method of customizing the fit of a portion of a casing of an in-ear audio device within a portion of an ear includes: driving an acoustic driver of the in-ear audio device to acoustically output a test sound into the ear canal of the ear; monitoring a microphone that is acoustically coupled to the ear canal to detect sounds within the ear canal that are indicative of the frequency response of the acoustic driver acoustically outputting the test sound into the ear canal; filling a bag of the casing with a filling material as the acoustic driver is driven to acoustically output the test sound and the microphone is monitored; and employing the sounds detected by the microphone that are indicative of the frequency response of the acoustic driver acoustically outputting the test sound into the ear canal to determine if a degree of sealing between the portion of the casing and the portion of the ear achieves a desired quality of frequency response of the acoustic driver acoustically outputting the test sound.

In still another aspect, an apparatus includes: a filling control to controllably convey filling material into a first tube structured to be coupled to a bag of a casing of an in-ear audio device; an earpiece interface to at least signal the in-ear audio device with a test sound to be acoustically output by an acoustic driver disposed within the casing of the in-ear audio device; a processing device; and a storage storing a sequence of instructions. When the sequence of instructions is executed by the processing device, the processing device is caused to: operate the earpiece interface to cause the acoustic driver to acoustically output the test sound into an ear canal of an ear; monitor a microphone that is acoustically coupled to the ear canal to detect sounds within the ear canal that are indicative of the frequency response of the acoustic driver acoustically outputting the test sound into the ear canal; operate the filling control to fill the bag with the filling material as the acoustic driver is driven to acoustically output the test sound and the microphone is monitored; and employ the sounds detected by the microphone that are indicative of the frequency response of the acoustic driver acoustically outputting the test sound into the ear canal to determine if a degree of sealing between the portion of the casing and the portion of the ear achieves a desired quality of frequency response of the acoustic driver acoustically outputting the test sound.

In each of these above aspects, the test sound may include a wide range of frequencies of human audible sounds or a lower human audible frequency.

Other features and advantages of the invention will be apparent from the description and claims that follow.

DETAILED DESCRIPTION

What is disclosed and what is claimed herein is intended to be applicable to a wide variety of in-ear audio devices, i.e., devices that are structured to be used in a manner in which at least a portion of the device is positioned within the concha and/or ear canal portions of an ear of a user. It should be noted that although specific embodiments of an in-ear audio device primarily serving the purpose of acoustically outputting audio are presented with some degree of detail, such presentations of specific embodiments are intended to facilitate understanding through provision of examples, and should not be taken as limiting either the scope of disclosure or the scope of claim coverage.

It is intended that what is disclosed and what is claimed herein is applicable to in-ear audio devices that either do or do not support two-way communications, and either do or do not support active noise reduction (ANR). In the case of in-ear audio devices that do support either two-way communications or ANR, it is intended that what is disclosed and claimed herein is applicable to an in-ear audio device incorporating one or more microphones disposed on a portion of the in-ear audio device that remains outside an ear when in use, on a portion that is inserted into a portion of an ear when in use, or disposed on both of such portions. Still other implementations of in-ear audio devices to which what is disclosed and what is claimed herein is applicable will be apparent to those skilled in the art.

Figure 1A:
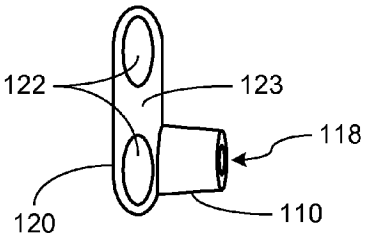
FIGS. 1a and 1b are perspective views of a embodiment of in-ear audio device.
Figure 1B:
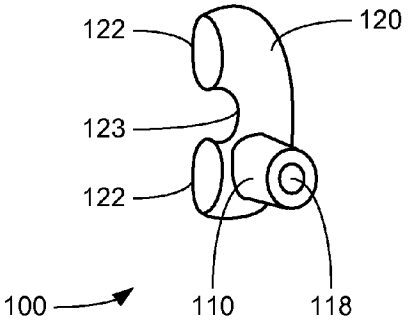

FIGS. 1a and 1b, taken together, provide two views of one embodiment of an in-ear audio device 100 having a casing made up of at least a canal portion 110 meant to be positioned within an ear canal of a user's ear and a concha portion 120 meant to be positioned within the concha of the user's ear. More specifically and as depicted, the concha portion 120 has a generally C-shaped configuration to substantially fill the concha of a user's ear while accommodating the complex shape of the concha as defined by portions of the tragus, anti-tragus, helix and anti-helix of the pinna of the ear. This C-shaped configuration has a pair of extensions 122 and defines an inset curve 123 to accommodate the partial protrusion of a portion of the helix into the concha. The canal portion 110 has a generally tubular shape extending from where one end of the canal portion 110 is coupled to the concha portion 120 at a location coincident with where the entrance to the ear canal is typically located in relation to the portion of the concha defined by portions of the tragus and anti-tragus. An aperture 118 is formed in the other end of the canal portion 110 to enable sounds to be acoustically output by an acoustic driver (not shown) positioned within the casing of the in-ear audio device 100 through the aperture 118 and into the ear canal when the in-ear audio device 100 is properly positioned in the user's ear during operation.

This embodiment of the in-ear audio device 100 depicted in FIGS. 1a-b may be any of a variety of types of in-ear audio device able to perform any of a variety of audio functions, including and not limited to, an in-ear earphone to acoustically output audio, an in-ear ANR device to provide a reduction in environmental noise sounds encountered by a user through the acoustic output of anti-noise sounds, and/or a two-way audio communications audio device employing detection of the user's speech sounds through bone conduction and/or a Eustachian tube connected to portions of the ear into which the in-ear audio device 100 is inserted. Further, it should be noted that although the concha portion 120 has been depicted and described as having a C-shaped configuration to substantially fill the concha, other embodiments are possible having a somewhat differently shaped concha portion 120 that does not fill as much of the concha. As will later be described in considerable detail, one or both of the canal portion 110 and the concha portion 120 is at least partly surrounded by one or more fitting bags (not shown) able to be filled with a filling material to customize the fit of the in-ear audio device 100 in the ear canal and/or the concha, respectively, of a user's ear.

Also, although not specifically depicted, the in-ear audio device 100 may further incorporate an electrically and/or optically conductive cable to enable the in-ear audio device 100 to at least receive audio to be acoustically output by the in-ear audio device 100 from another audio device (not shown) to which the in-ear audio device 100 is coupled via such a cable. Alternatively and/or additionally, the in-ear audio device 100 may receive such audio through a wireless coupling with another device.

Figure 2A:
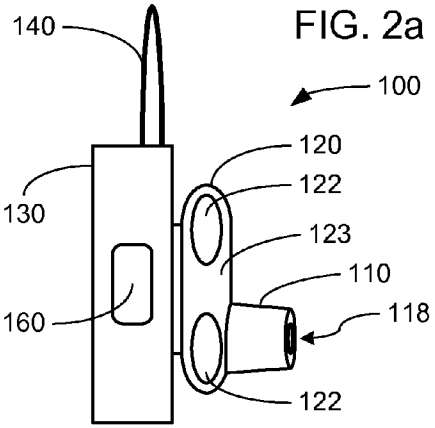
FIGS. 2a and 2b are perspective views of another embodiment of in-ear audio device.
Figure 2B:
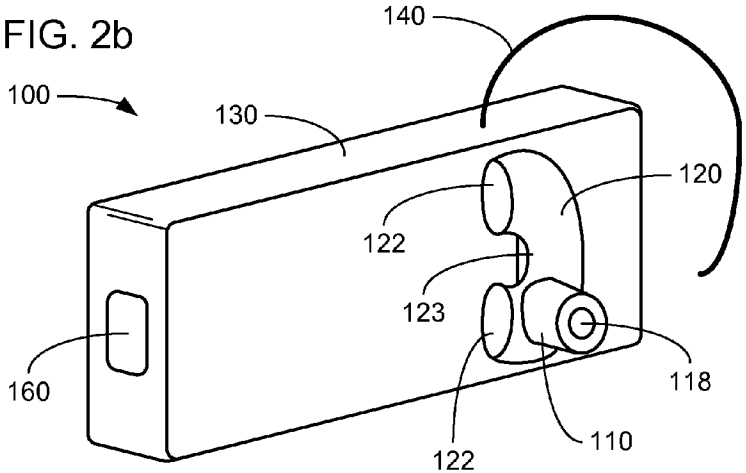

FIGS. 2a and 2b, taken together, provide two views of another embodiment of the in-ear audio device 100 that additionally incorporates an outer portion 130 meant to be positioned alongside the pinna of a user's ear during operation, and a support portion 140 to engage a portion of the pinna during operation. More specifically, the outer portion 130 has an elongate shape with one end coupled to the concha portion 120 in a manner that positions the outer portion 130 just outside the pinna, and the other end extending therefrom and alongside the pinna towards the user's mouth. To the one end of the outer portion 130 that is coupled to the concha portion 120 may also be coupled a support portion 140 engage a portion of the pinna as an aid to securing the in-ear audio device 100 in place relative to the user's ear during operation. Disposed on the other end of the outer portion 130 that extends towards the users mouth is a communications microphone 160 to detect speech sounds of the user from the vicinity of the user's mouth.

The embodiment of in-ear audio device 100 depicted in FIGS. 2a-b may be any of a variety of types of in-ear audio device able to perform 2-way communications (e.g., a wireless headset or "earset" for use with a cell phone). This variant of in-ear audio device 100 may also provide ANR and/or may wirelessly receive entertainment audio from an audio device (e.g., the same cell phone used in two-way communications, or a digital audio player).

Figure 3B:
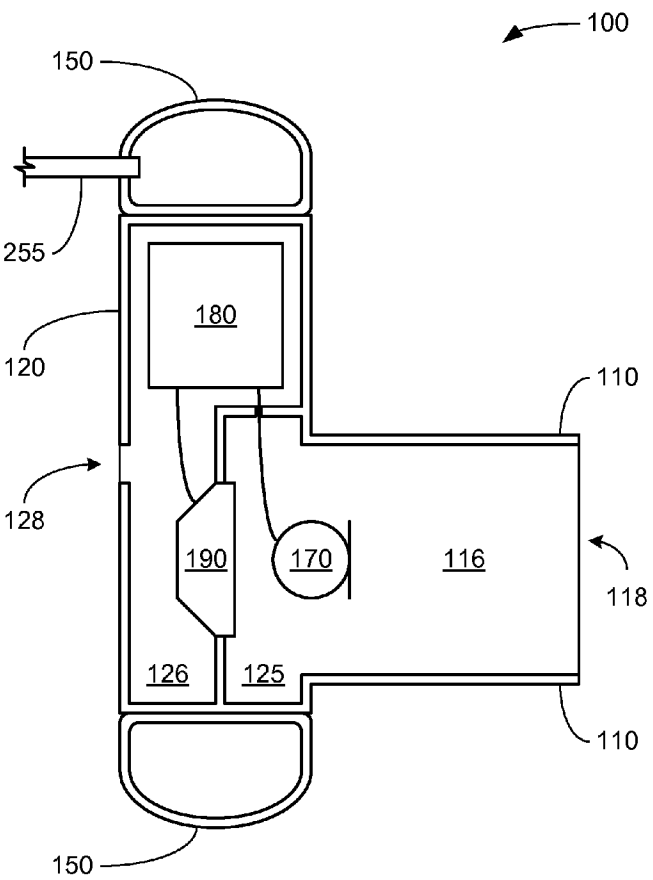
FIGS. 3a and 3b are partially cutaway views of variants of the embodiment of in-ear audio device of FIGS. 1a and 1b prepared for customization of fit into portions of a user's ear.
Figure 3A:
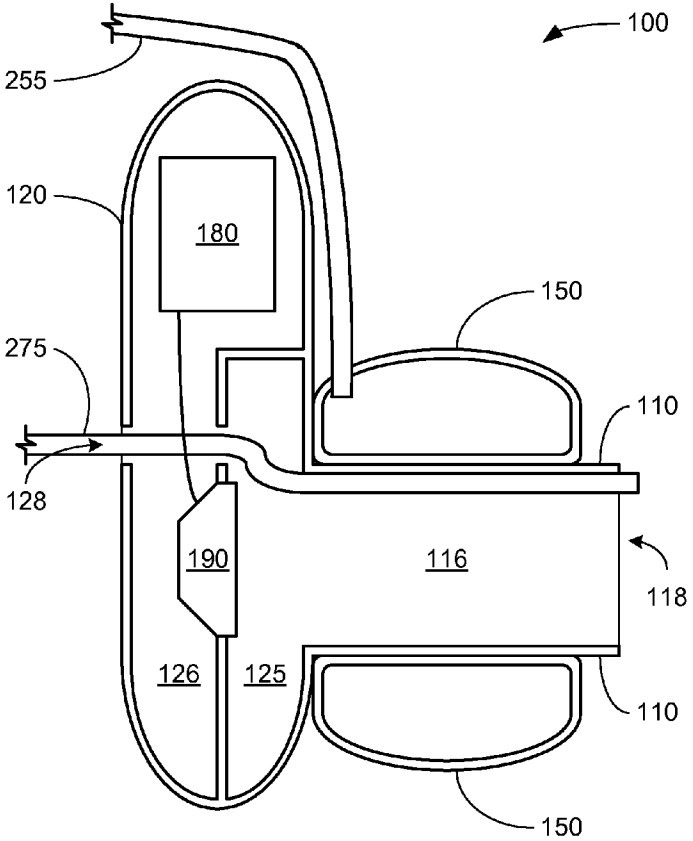

FIGS. 3a and 3b show partially cut-away views of two different variants of the in-ear audio device 100 of FIGS. 1a-b at least partially prepared for customization of fit into a portion of a user's ear. More specifically, the variant depicted in FIG. 3a has been prepared for customization of fit into a portion of the ear canal of the user's ear, and the variant in FIG. 3b has been prepared for customization of fit into a portion of the concha of the user's ear. Both of these depicted variants have a physical configuration generally similar to what was depicted in FIGS. 1a and 1b.

As depicted, the casings of both variants incorporate the canal portion 110 and the concha portion 120. Other possible variants (not depicted in cut-away views) may further include the outer portion 130. Further, both variants incorporate circuitry 180 and an acoustic driver 190 that is electrically coupled to the circuitry 180. Within the canal portion 110, a channel 116 is formed that extends from the aperture 118 through to an open interior portion 125 of the concha portion 120. Within the concha portion 120, the open interior portion 125 is separated by wall structure and the acoustic driver 190 from another open interior portion 126 in which the circuitry 180 is depicted as being disposed (though it should be noted that the circuitry 180 may be disposed in any of a variety of locations either within the casing of the in-ear audio device 100, or externally thereof).

The casings of both variants further incorporate one or more bags 150 to be expanded through injecting moldable material via one or more tubes 255 to cause the one or more bags 150 to expand into a portion of the user's ear as part of the process of customizing the fit into the user's ear, as will be explained in greater detail. An important difference between these two depicted variants is that the variant of FIG. 3a has an annular form of one bag 150 extending around the canal portion 110, while the variant of FIG. 3b has one or more bags 150 extending about the concha portion 120. Thus, the variant of FIG. 3a is prepared for the fit of the canal portion 110 within the ear canal of the user's ear to be customized, while the variant of FIG. 3b is prepared for the fit of the concha portion 120 within the concha of the user's ear to be customized. It should be noted that these are but two examples of the manner in which the fit of variants of the in-ear audio device 100 in the ear of a user may be customized. For example, although not specifically depicted, a variant is possible in which one or more bags 150 are disposed on portions of both the canal portion 110 and the concha portion 120 to enable the fit in both the ear canal and the concha of a user's ear to be customized.

There are two goals meant to be achieved in customizing the fit of either of these variants (or of still other variants) of the in-ear audio device 100 within an ear. First, is to provide a fit that is snug enough that the in-ear audio device 100 (whatever the variant) cannot simply fall out of a user's ear. Second, is to provide a close enough fit between a portion of the casing of the in-ear audio device 100 and a portion of a user's ear to enable a seal to be reliably formed therebetween that acoustically separates the environment within the ear canal from the external environment each time the user inserts the in-ear audio device 100 into their ear. As those skilled in the art of acoustics will readily recognize, with an entrance to the ear canal being formed of pliable skin, muscle and other tissues, the degree of sealing from the external environment actually alters the acoustic response of the ear canal to sounds acoustically output by the acoustic driver 190. Thus, it is desired to achieve a degree of fit that will enable a good degree of sealing to be achieved each time the user inserts the in-ear audio device into the ear for which the fit was customized. Enabling a seal to be reliably and repeatably formed each time the user inserts the in-ear audio device 100 into their ear enables a predictable degree of quality of frequency response of the acoustic driver 190 acoustically outputting audio into the ear canal, and this enables more consistent provision of higher quality sound into the ear canal, more consistent detection of the user's voice from within the ear (in variants supporting two-way communications through detecting the user's voice through the user's ear), and more consistent provision of ANR (e.g., enabling provision of feedback-based ANR with reduced likelihood of instability). In particular, the formation of such a seal enables the acoustic driver 190 to more efficiently acoustically output lower frequency (bass) sounds, which aids both in providing higher fidelity acoustic output of entertainment and voice audio, and in providing ANR.

Both of the variants of FIGS. 3a and 3b, in being prepared for customizing the fit of each into an ear of a user, are provided with a microphone that is acoustically coupled to the channel 116 for use in adjusting the customized fit, as will be explained in greater detail. However, while the microphone employed in customizing the fit of the variant of FIG. 3a is an instrument microphone acoustically coupled to a tube 275 that is inserted through apertures 128 formed through portions of the concha portion 120 so that the tube 275 opens into the channel 116, the microphone employed in customizing the fit of the variant of FIG. 3b is a built-in microphone 170 disposed within the channel 116 and/or the open interior portion 125 and electrically coupled to the circuitry 180. This is another important difference between these two variants. The variant of FIG. 3a normally has no microphone disposed within its casing, and may be a form of the in-ear audio device 100 that only acoustically outputs audio received by the circuitry 180 from another audio device serving as a source of audio and coupled to this form of the in-ear audio device 100 via a wireless link (through a receiver or transceiver of the circuitry 180) or via some form of electrically or optically conductive cable (not shown) that is coupled to the circuitry 180. In contrast, the variant of FIG. 3b incorporates the built-in microphone 170, and may be a form of the in-ear audio device 100 that supports two-way communications in which the built-in microphone 170 is employed to detect the user's speech sounds from within the ear canal or may be a form of the in-ear audio device 100 that provides feedback-based ANR in which the built-in microphone 170 is employed to detect noise sounds within the ear canal as feedback reference noise sounds from which feedback anti-noise sounds are derived.

Both of the variants of FIGS. 3a and 3b are depicted as having at least the aperture 128 formed between the open interior portion 126 and the environment external to a user's ear. It may be that the apertures 128 in the variant of FIG. 3a are solely for the purpose of enabling the insertion of the tube 275 of an instrument microphone through portions of the concha portion 120 and into the channel 116 within the canal portion 110 (and preferably, such multiple apertures 128 are aligned to make the insertion of the tube 275 easier). However, in both variants, one or more of the apertures 128 may serve as acoustic ports to in some way tune the frequency response of the acoustic driver 190 and/or may serve to enable equalization of air pressure between the ear canal and the external environment. Specifically, such ones of the apertures 128 may have dimensions and/or other physical characteristics selected to acoustically couple one or open portions within the casing of the in-ear audio device 100 to each other and/or to the external environment within a selected range of frequencies. Further, one or more damping elements (not shown) may be disposed within one or more of such ones of the apertures 128 to cooperate with characteristics of the acoustic driver 190 to alter frequency response.

Additionally or alternatively, one or more of the apertures 128 may be formed in the concha portion 120 (and/or in other portions of the casing) to provide a controlled acoustic leak between the ear canal and the external environmental for purposes of controlling the effects of variations in fit that may develop over time after customization has been performed and an initial fit bringing about a desired quality of acoustic response has been achieved. As will be recognized by those skilled in the art, variations in the health or other aspects of the physical condition of a user can bring about minor alterations in the dimensions and/or shape of the ear canal over time such that the quality of the seal able to be formed with each insertion of the in-ear audio device 100 into the ear over time may degrade. Thus, in some embodiments, the dimensions and/or other characteristics of one or more apertures 128 formed in the casing may be selected to aid in mitigating the effects of a slightly degraded quality of seal by providing a pre-existing leak of controlled characteristics that mitigates the acoustic effects of other leaks developing in the future in the seal between the casing of the in-ear audio device 100 and portions of the ear. For example, the dimensions of one or more apertures 128 may be selected to be large enough to provide a far greater coupling between the ear canal and the external environment than any other coupling through a leak in the seal that may develop at a later time.

Figure 4:
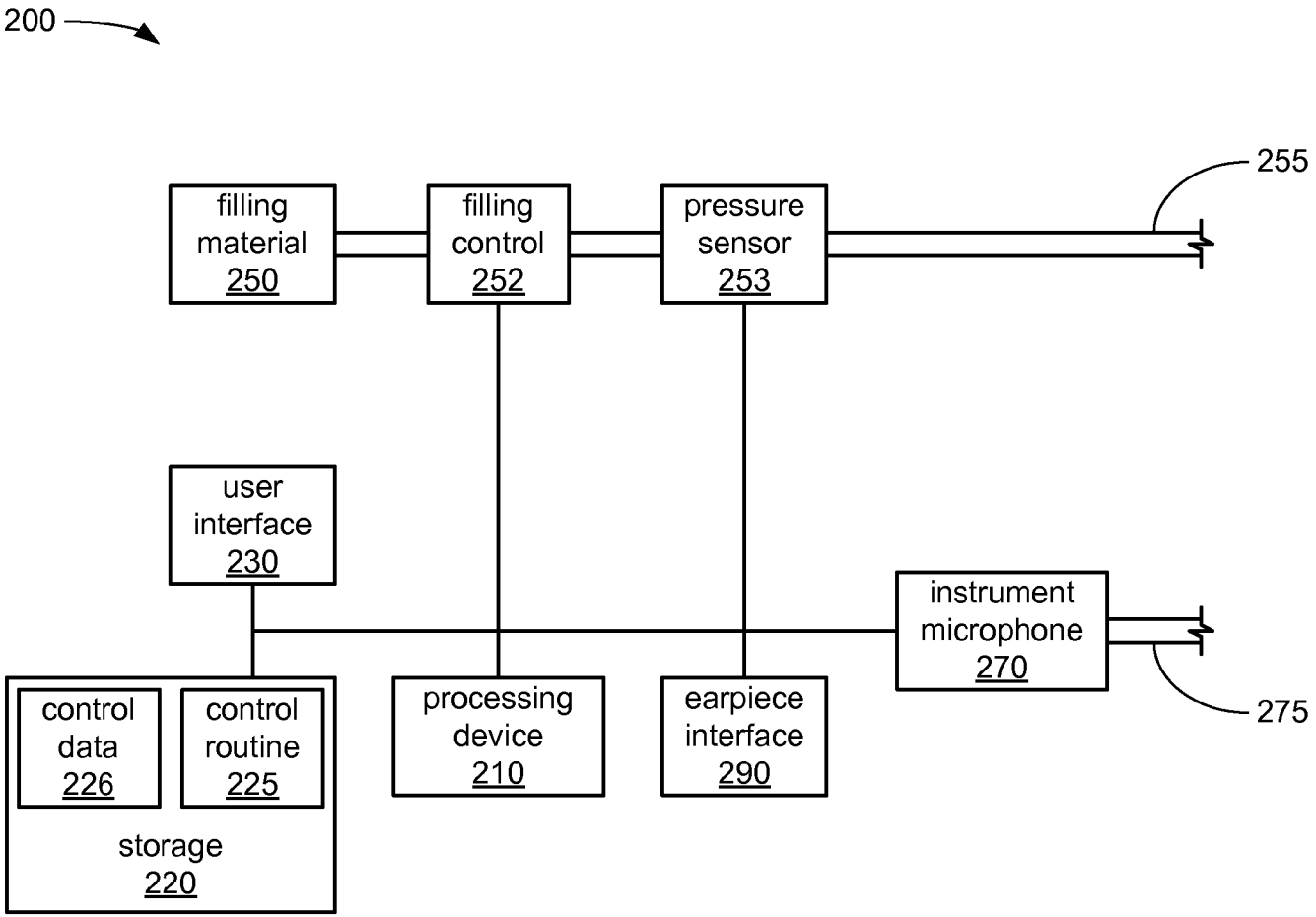
FIG. 4 is block diagram of a customization system usable with any of the embodiments or variants of embodiments of in-ear audio device depicted in any of the above figures.

FIG. 4 provides a block diagram of a customizing system 200 by which the process of customizing the fit of the in-ear audio device 100 within an ear of a user is performed and controlled. It is contemplated that the customizing system 200 would be operated by an operator with some amount of training in aspects of customizing the fit of the in-ear audio device 100, perhaps a nurse or other type of technician at a clinic. However, it is certainly possible that the customizing system 200 could be made easy enough to use as to make it reasonable for a would-be user of the in-ear audio device 100 to operate it to customize the fit within one of their own ears.

The customizing system 200 incorporates a source of filling material 250, a filling control 252 and a pressure sensor 253, all coupled to controllably provide an amount of the filling material 250 to one or more bags 150 formed on the canal portion 110 and/or the concha portion 120 of the casing of the in-ear audio device 100 through one or more tubes 255 coupled to those one or more bags 150. The customizing system 200 also incorporates a user interface 230 including one or more audible and/or visible indicators (e.g., buzzers, status lights, LCD display, etc.) and manually-operable controls (e.g., manually-operable switches, keyboard, etc.) to allow manual control of at least some aspects of customization of fit, a storage 220 in which is stored a control routine 225, and a processing device 210 coupled to the storage 220 to access and execute a sequence of instructions of the control routine 225. The processing device 210 is also coupled to the filling control 252 to operate the filling control 252 to effect the filling of one or more of the bags 150 through one or more of the tubes 255 to a controlled extent, and is further coupled to the pressure sensor 253 to monitor the pressure created in the tube 255 during customization. The customizing system 200 also incorporates at least an earpiece interface 290 to enable coupling of the customization system 200 (with either a wired or wireless coupling) to the circuitry 180 of the in-ear audio device 100 to at least cause the acoustic driver 190 to be driven to acoustically output various test sounds during customization. The customizing system 200 may further incorporate the instrument microphone 270, at least where the instrument microphone 270 is to be used in monitoring the acoustic results of the acoustic output of the test sounds, instead of the built-in microphone 170 in variants of the in-ear audio device 100 that incorporate the built-in microphone 170 (e.g., the variant of FIG. 3b). Where such a built-in microphone as the built-in microphone 170 is employed, the earpiece interface 290 may be further employed to use its coupling to the circuitry 180 to enable monitoring of the built-in microphone 170.

In essence, an embodiment of performing a customization of fit entails inserting one of the in-ear audio devices 100 with one or more of the bags 150 initially in a collapsed state into an ear of a would-be user of that in-ear audio device 100, and then filling the one or more of the bags 150 with a slowly increasing amount of the filling material 250 while the acoustic driver 190 is driven to acoustically output various test sounds (perhaps continuously or perhaps at intervals), while a microphone (either the built-in microphone 170 or the instrument microphone 270) is used to monitor the acoustic results of the acoustic output of those test sounds, and while the pressure sensor 253 is monitored to avoid filling the one or more bags 150 with the filling material 250 at a pressure outside an expected range. The filling continues until whatever microphone is employed detects sounds with characteristics indicating a desired degree of sealing has been achieved, until the would-be user indicates (perhaps through the user interface 230) that the fit resulting from the filling of the one or more bags 150 is becoming uncomfortable, or until the pressure sensor 253 detects a pressure outside a predetermined range of pressures that are expected to be encountered during customization. It may be that after the filling is done some small amount of the filling material 250 is then withdrawn from the one or more bags 150 to achieve a degree of filling of the one or more bags 150 that is found to provide the desired degree of sealing. The filling material 250 is then allowed to cure or "set up" such that it ceases to be in the liquid form that enabled filling through one or more of the tubes 255, and becomes more solid so that the one or more bags 150 permanently hold a shape that is customized to that user's ear (though preferably still soft to some desired degree that provides some degree of comfort).

Turning to some of the internal details of carrying out customization, it is through accessing the storage 220 to retrieve and execute a sequence of instructions of the control routine 225 that the processing device 210 is caused to control customization. First, the processing device 210 awaits input via the user interface 230 that the in-ear audio device 100 has been properly positioned within an ear of the would-be user, and that the one or more tubes 255 needed to fill one or more bags 150 of the in-ear audio device 100 are in place such that customization can be performed. The processing device 210 then operates the earpiece interface 290 to convey test sounds to the circuitry 180 of the in-ear audio device 100 to cause the acoustic driver 190 therein to output test sounds. The processing device 210 also either monitors the instrument microphone 270 or further operates the earpiece interface 290 to obtain to monitor the built-in microphone 170 through the circuitry 180 (depending on which of these two microphones is employed in customization) to monitor the acoustic results of the acoustic output of the test sounds by the acoustic driver 190. While causing the test sounds to be acoustically output and monitoring the results of doing so, the processing device 210 further operates the filling control 252 to begin filling the one or more bags 150 of the in-ear audio device 100 with the filling material 250 through the one or more tubes 255 employed, and the processing device 210 also monitors the pressure sensor 253 for indications of a pressure level outside a range of pressures expected to be detected during customization.

Preferably, the processing device 210 is caused by execution of the control routine 255 to simply continue causing the acoustic output of test sounds, continue monitoring the acoustic results through whichever microphone is employed, and continue filling the one or more bags 150 with the filling material 250 until the characteristics of the sounds detected by that microphone indicate that a seal has been achieved between the in-ear audio device and the ear that the ear canal is sufficiently acoustically separated from the external environment that a desired quality of acoustic response to the acoustic output of the acoustic driver 190 has been achieved. Upon receiving this indication, the processing device 210 operates the filling control 252 to cease filling the one or more bags 150 with the filling material 250.

Although it is preferred that the customizing of fit be carried out under the control of the processing device 210 as directed through its execution of the control routine 225, it may still be desired to provide some visual or other indication through the user interface 230 of conditions during and/or following customization, perhaps to enable some degree of "fine tuning" of the fit by an operator. More specifically, the user interface 230 may be operable by the processing device to provide an operator with a visual display or other indication of the selection of test sounds being employed by the processing device 210, the frequency response of the ear canal to the acoustic output of those test sounds by the acoustic driver 190 of the in-ear audio device 100, and of the pressure at which the filling material 250 is provided to the one or more bags 150. The provision of such information would enable an operator to perhaps guide the choice of test sounds and/or the pressure at which filling is done. While the processing device 210 may access some amount of control data 226 stored in the storage 220 to obtain data concerning frequency response characteristics of known instances of a good seal resulting in a desirable degree of frequency response being achieved as a reference against which to compare frequency response characteristics observed during a current customization. The control data 226 may further include statistical and/or predictive analysis algorithms to be employed by the processing device 210 in iterating through testing differing degrees of filling the one or more bags 150 with different test sounds as part of achieving a degree of filling of the one or more bags 150 that achieves a fit that enables a desired quality of frequency response.

It is desired that the filling occur without a level of pressure being detected by the pressure sensor 253 that is either lower than expected such that it may be an indication of a leakage of the filling material 250, or that is higher than expected such that it may be an indication of a blockage in a tube 255 such that filling material 250 is not being conveyed through that tube 255. A maximum pressure level may also be selected that the processing device 210 does not allow to be exceeded as a safety feature to avoid injury to would-be users. In response to the detection of a level of pressure outside the expected range, the processing device 210 may be caused by the control routine 225 to immediately operate the filling control 252 to cease conveying any more of the filling material 250 into the one or more tubes 255 being used, and may further operate the filling control 252 to withdraw at least some of the filling material 250 previously conveyed into the one or more tubes 255 being used. Further, the user interface 130 may be operable by the processing device 210 to provide a visual or audible alert of the anomalous pressure level that has been detected.

It is also desired that customization be completed without the user interface 230 needing to be operated by someone to manually intercede in the customizing, perhaps due to the would-be user indicating that the one or more bags 150 have been filled to a point that the fit is uncomfortable. However, with the high degree of variability in physiology of ears between different people, it may be that a particular would-be user of the in-ear audio device 100 is all too sensitive to the sensation of having the one or more bags 150 being filled to the extent that enough of a seal is created that the desired quality of frequency response is achieved, and thus, a somewhat lesser quality of frequency response may have to be accepted. To accommodate this possibility, it may be that the user interface 230 includes a manually-operable controlled that is provided to the would-be user of the in-ear audio device 100 during customization that allows them to immediately stop the filling of the one or more bags 150 upon beginning to feel some undesirable amount of discomfort. The user interface 230 may be operable by the processing device 210 to provide a visual display of aspects of the frequency response achieved thus far in that customization to allow an operator of the customizing system 200 to determine if a less than desired quality of frequency response is still good enough. Yet further, the user interface 130 may be operable to provide a visual display of the pressure under which the filling material 250, which may provide some insight to an operator of the customizing system 200 as to whether enough of a snug fit has yet been achieved to prevent the in-ear audio device 100 from falling out of the would-be user's ear. If the would-be user suffers from some physiological or neurological condition that precludes even filling the one or more bags of the in-ear audio device 100 with enough filling material 250 to achieve even a fit that will prevent the in-ear audio device 100 from falling out, then it may not be possible to customize the fit for that ear of that particular would-be user.

In some embodiments, the test sounds are made up of a wide range of frequencies of human audible sounds (e.g., 20 Hz to 20 KHz). Such a wide range of frequencies may be covered with an acoustic output of sounds that sweep continuously from one end of the range of frequencies to another, or that step through a number of distinct frequencies selected throughout the range of frequencies, or in some other manner. Such a wide spectrum of frequencies may be further employed to develop an equalization curve to be programmed into the circuitry 180 to further enhance the quality of sound experienced by the would-be user as the listen to audio output by the acoustic driver 190 during normal use of the in-ear audio device 100 after customization has been done. Alternatively or additionally, such an equalization curve may be programmed into an audio source device (e.g., a radio) that provides audio to the circuitry 180 for being acoustically output by the acoustic driver 190. Indeed, where a broad range of frequencies of sounds is to be used, a carefully selected piece of music with the desired range of frequencies of sounds may be used.

Alternatively, in other embodiments, the test sounds are made up of lower frequency sounds (e.g., approximately 50-300 Hz). Such frequencies may be chosen to correspond to dimensions and/or other physical characteristics that are selected and given to one or more of the apertures 128 (however many there may be in a given embodiment) to acoustically couple the ear canal to the external environment within those lower frequencies, possibly to enhance the effectiveness of those test sounds in evaluating frequency response. However, such lower frequency sounds may still be supplemented with a range of higher frequency sounds employed to test for possible resonances acoustic resonances within an ear canal.

In some embodiments, the casing of the in-ear audio device 100 may be separable into multiple pieces, either to allow for some greater flexibility in customization or to allow a previously customized portion of the casing of one in-ear audio device 100 to be separated and used with another. For example, there may be a selection of canal portions 110 from which a particular canal portion 100 may be selected to accommodate a particular size of ear canal of a particular would-be user. Correspondingly, there may be a selection of concha portions 120 from which a particular concha portion 120 may be selected to accommodate a particular size of concha of a particular would-be user. Also for example, either a single bag 150 or a set of the bags 150 may be separable from other casing portions to enable their reuse with other casing portions of a replacement or upgraded form of in-ear audio device 100 (perhaps some newer version that adds ANR, has a higher quality acoustic driver, or provides some other audio feature) to allow a fit previously achieved using that one or more bags 150 to be carried over as a user of one in-ear audio device 100 makes a switch to another one.

Indeed, a mixing and matching of different casing portions may precede the customization of fit as a way of first achieving a "rough" fit before employing one or more of the bags 150 in customization to achieve a still better fit. The use of different ones of a selection of the canal portion 110 and/or the concha portion 120 (and/or still other casing portions) can change the test sounds that are best used and/or the characteristics of the frequency response sought to be achieved during customization. For example, different sizes of the canal portion 110 can bring about different lengths and/or diameters of the channel 116 and/or different dimensions of the aperture 118 into the ear canal such that the acoustics of the canal portion 110 are sufficiently different among different sizes of the canal portion 110 that a single set of test sounds are not effective for use among all of the different sizes.

It may be that some form of memory device or other type of data storage is carried within the in-ear audio device 100 (possibly within the circuitry 180) that stores information concerning its customization for a particular user, such as characteristics of the test sounds used (e.g., types of sounds, frequencies used), characteristics of the filling material 250 (e.g., its composition, viscosity, pressure, volume used), characteristics of one or more portions of the casing (e.g., dimensions of one or the other of the canal portion 110 and concha portion 120). This may be of use in speeding subsequent customizations of future in-ear audio devices 100 for use by the same user, perhaps avoiding the need to again deduce what sizes of casing portions should be selected or what test sounds are best used for a particular ear. Such information may additionally or alternatively be maintained by a server (not shown) that perhaps stores sets of such information over time as new customizations for a particular user are done over time—perhaps enabling trends concerning characteristics of a particular user's ear(s) to be derived that may be useful to future customizations.

In yet other alternative embodiments, it may be that no microphone is employed in monitoring the acoustic results of the acoustic output of test sounds to determine when a desired quality of frequency response has been achieved. Instead, the impedance and/or other characteristics of the acoustic driver 190, itself, may be monitored to detect an instance of the acoustic driver 190 having an impedance or other characteristic during acoustic output of a sound of a known frequency that is indicative of a desirable quality of frequency response being achieved.

It should be noted that although customization has been presented herein as a process carried out time to achieve a fit for a given in-ear audio device, embodiments of an in-ear audio device are possible in which the in-ear audio device maintains a reservoir of filling material that does not cure and that is employed in performing a customization every time it is put into a user's ear.

Other implementations are within the scope of the following claims and other claims to which the applicant may be entitled.

The invention claimed is:

1. A method of customizing the fit of a portion of a casing of an in-ear audio device within a portion of an ear, the method comprising:

driving an acoustic driver of the in-ear audio device to acoustically output a test sound into the ear canal of the ear;

monitoring a microphone that is acoustically coupled to the ear canal to detect sounds within the ear canal that are indicative of the frequency response of the acoustic driver acoustically outputting the test sound into the ear canal;

filling a bag of the casing with a filling material as the acoustic driver is driven to acoustically output the test sound and the microphone is monitored; and employing the sounds detected by the microphone that are indicative of the frequency response of the acoustic driver acoustically outputting the test sound into the ear canal to determine if a degree of sealing between the portion of the casing and the portion of the ear achieves a desired quality of frequency response of the acoustic driver acoustically outputting the test sound.

2. The method of claim 1, wherein the test sound comprises a wide range of frequencies of human audible sounds.

3. The method of claim 1, wherein the test sound is at a lower human audible frequency.

4. The method of claim 3, wherein the casing comprises at least one aperture that acoustically couples the ear canal to an external environment that is external to the casing at the lower human audible frequency.

5. The method of claim 1, wherein monitoring the microphone comprises monitoring a built-in microphone disposed within the casing of the in-ear audio device.

6. The method of claim 1, wherein:

the microphone is an instrument microphone comprising a tube; and the method further comprises inserting the tube of an instrument microphone through an aperture formed in the casing to acoustically couple the instrument microphone to the ear canal through the tube to enable detecting the sounds within the ear canal that are indicative of frequency response.

7. The method of claim 1, wherein:

filling the bag with the filling material comprises filling the bag with the filling material in a liquid state before the filling material cures; and the method further comprises waiting for the filling material to cure within the bag before removing the in-ear audio device from the ear.

8. The method of claim 1, further comprising:

monitoring the level of pressure with which the filling material is conveyed to the bag to fill the bag; and ceasing to convey the filling material to the bag in response to the level of pressure being outside a predetermined range of pressure levels expected to be detected during filling of the bag.

9. The method of claim 1, further comprising:

monitoring a manually-operable control for an indication of the degree of filling of the bag causing discomfort to a would-be user of the in-ear audio device to whom the ear belongs; and ceasing to convey the filling material to the bag in response to the indication.

10. An apparatus comprising:

a filling control to controllably convey filling material into a first tube structured to be coupled to a bag of a casing of an in-ear audio device;

an earpiece interface to at least signal the in-ear audio device with a test sound to be acoustically output by an acoustic driver disposed within the casing of the in-ear audio device;

a processing device; and a storage storing a sequence of instructions that when executed by the processing device causes the processing device to:

operate the earpiece interface to cause the acoustic driver to acoustically output the test sound into an ear canal of an ear;

monitor a microphone that is acoustically coupled to the ear canal to detect sounds within the ear canal that are indicative of the frequency response of the acoustic driver acoustically outputting the test sound into the ear canal;

operate the filling control to fill the bag with the filling material as the acoustic driver is driven to acoustically output the test sound and the microphone is monitored; and employ the sounds detected by the microphone that are indicative of the frequency response of the acoustic driver acoustically outputting the test sound into the ear canal to determine if a degree of sealing between the portion of the casing and the portion of the ear achieves a desired quality of frequency response of the acoustic driver acoustically outputting the test sound.

11. The apparatus of claim 10, wherein the test sound comprises a wide range of frequencies of human audible sounds.

12. The apparatus of claim 10, wherein the test sound is at a lower human audible frequency.

13. The apparatus of claim 12, wherein the casing comprises at least one aperture that acoustically couples the ear canal to an external environment that is external to the casing at the lower human audible frequency.

14. The apparatus of claim 10, wherein the microphone comprises a built-in microphone disposed within the casing of the in-ear audio device.

15. The apparatus of claim 10, further comprising the microphone, wherein the microphone is an instrument microphone comprising a tube to be inserted through an aperture formed in the casing to acoustically couple the instrument microphone to the ear canal through the tube to enable detecting the sounds within the ear canal that are indicative of frequency response.

16. The apparatus of claim 10, further comprising a pressure sensor, wherein the processing device is further caused to:

monitor the level of pressure with which the filling material is conveyed to the bag to fill the bag; and cease conveying the filling material to the bag in response to the level of pressure being outside a predetermined range of pressure levels expected to be detected during filling of the bag.

17. The apparatus of claim 10, further comprising a user interface comprising a manually-operable control, wherein the processing device is further caused to:

monitor the manually-operable control for an indication of the manually-operable control being operated to cause the filling of the bag to stop due to discomfort of a would-be user of the in-ear audio device to whom the ear belongs; and cease conveying the filling material to the bag in response to the indication.

*18. A method of characterizing the fit of a portion of a casing of an in-ear audio device within a portion of an ear, the method comprising:*

*driving an acoustic driver of the in-ear audio device to acoustically output a test sound into the ear canal of the ear;*

*monitoring a microphone that is acoustically coupled to the ear canal to detect sounds within the ear canal that are indicative of the frequency response of the acoustic driver acoustically outputting the test sound into the ear canal; and*

*employing the sounds detected by the microphone that are indicative of the frequency response of the acoustic driver acoustically outputting the test sound into the ear canal to determine if a degree of sealing between the portion of the casing and the portion of the ear achieves a desired quality of frequency response of the acoustic driver acoustically outputting the test sound, wherein the test sound comprises a wide range of frequencies of human audible sounds.*

*19. The method of claim 18, wherein the casing comprises at least one aperture that acoustically couples the ear canal to an external environment that is external to the casing.*

*20. The method of claim 18, wherein monitoring the microphone comprises monitoring a built-in microphone disposed within the casing of the in-ear audio device.*

*21. The method of claim 18, wherein the test sound comprises music.*

*22. The method of claim 18, wherein the in-ear audio device is an active noise reduction (ANR) device.*

*23. The method of claim 18, further comprising outputting a visual indication through a user interface associated with the in-ear audio device of the frequency response of the acoustic driver acoustically outputting the test sound into the ear canal.*

*24. The method of claim 18, wherein the test sound is one of a plurality of test sounds, and further comprising outputting a visual indication through a user interface associated with the in-ear audio device of the plurality of test sounds.*

*25. The method of claim 18, further comprising comparing the frequency response to data comprising frequency response characteristics indicative of a sufficient seal.*

*26. The method of claim 18, further comprising selecting the casing from one of a plurality of different sized casings.*

*27. An in-ear audio device comprising:*

*an earpiece interface to at least signal the in-ear audio device with a test sound to be acoustically output by an acoustic driver disposed within a casing of the in-ear audio device;*

*a processing device; and*

*a storage storing a sequence of instructions that when executed by the processing device causes the processing device to:*

*operate the earpiece interface to cause the acoustic driver to acoustically output the test sound into an ear canal of an ear;*

*monitor a microphone that is acoustically coupled to the ear canal to detect sounds within the ear canal that are indicative of the frequency response of the acoustic driver acoustically outputting the test sound into the ear canal; and*

*employ the sounds detected by the microphone that are indicative of the frequency response of the acoustic driver acoustically outputting the test sound into the ear canal to determine if a degree of sealing between the portion of the casing and the portion of the ear achieves a desired quality of frequency response of the acoustic driver acoustically outputting the test sound, wherein the test sound comprises a wide range of frequencies of human audible sounds.*

*28. The in-ear audio device of claim 27, wherein the casing comprises at least one aperture that acoustically couples the ear canal to an external environment that is external to the casing.*

*29. The in-ear audio device of claim 27, wherein the microphone comprises a built-in microphone disposed within the casing of the in-ear audio device.*

*30. The in-ear audio device of claim 27, wherein the in-ear audio device is an active noise reduction (ANR) device.*

*31. The in-ear audio device of claim 27, further comprising a user interface associated with the in-ear audio device, and wherein the processor is further configured to output a visual indication on the user interface of the frequency response of the acoustic driver acoustically outputting the test sound into the ear canal.*

*32. The in-ear audio device of claim 27, wherein the test sound is one of a plurality of test sounds, and further comprising a user interface associated with the in-ear audio device, wherein the processor is further configured to output a visual indication on the user interface of the plurality of test sounds.*

*33. The in-ear audio device of claim 27, wherein the processor is further configured to compare the frequency response to data comprising frequency response characteristics indicative of a sufficient seal.*

*34. The in-ear audio device of claim 27, wherein the casing is selected from one of a plurality of different sized casings.*

*35. The in-ear audio device of claim 27, wherein the test sound comprises music.*

* * * * *